July 20, 1943.  M. KLEIN ET AL  2,324,586

HARDNESS TESTER

Filed July 24, 1940  2 Sheets-Sheet 1

Inventors
Maximilian Klein
Ernest H. Grauel

By Strauch & Hoffman
Attorneys

July 20, 1943.    M. KLEIN ET AL    2,324,586
HARDNESS TESTER
Filed July 24, 1940    2 Sheets-Sheet 2

Inventors
Maximilian Klein
Ernest H. Grauel

By Strauch & Hoffman
Attorneys

Patented July 20, 1943

2,324,586

UNITED STATES PATENT OFFICE 2,324,586

HARDNESS TESTER

Maximilian Klein, Sellersville, and Ernest H. Grauel, Perkasie, Pa., assignors to United States Gauge Company, Sellersville, Pa., a corporation of Pennsylvania Application July 24, 1940, Serial No. 347,326

7 Claims. (Cl. 265—19)

This invention relates to measuring instruments and is more particularly concerned with improvements in durometers or like force measuring instruments.

As its preferred embodiment, the invention will be described as a durometer for measuring and testing the hardness of rubber or similar deformable materials.

It is a major object of the present invention to provide a novel, accurate, structurally simple, inexpensive, portable durometer or like instrument.

A further object of the invention is to provide a durometer or the like wherein a visible indicator and a pin or plunger adapted to engage the material to be tested or measured are interconnected by novel motion transmitting mechanism.

A further object of the invention is to provide a novel durometer or the like wherein motion of a pin or plunger adapted to engage the material to be tested is opposed by a spring which may be adjusted.

A further object of the invention is to provide a novel durometer or the like wherein all of the principal operating parts are carried by a common support, such as a flat plate, separate from the durometer housing. This arrangement contributes to ease and speed in assembly.

A further object of the invention is to provide a durometer wherein the movable instrument parts are returned to initial or zero position by novel mechanism, the latter being distinct from the spring which opposes motion of the pin or plunger adapted to engage the material to be tested.

Further objects of the invention will become apparent as the description proceeds in connection with the appended claims and the accompanying drawings in which:

Figure 1:
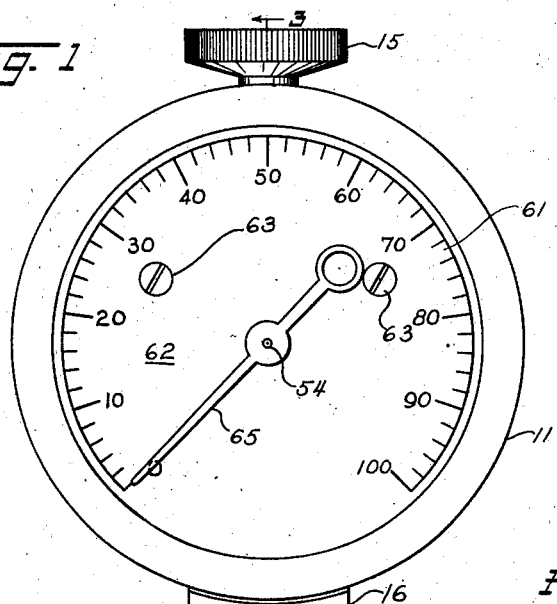
Figure 1 is a front elevation of a preferred embodiment of the durometer of the invention.

The mechanism of the invention is housed in a shallow cylindrical cup-shaped durometer casing 11 which is formed with a peripheral bead 12 upon which is snapped a bezel 13 holding a cover glass 14 similar to the usual watch glass.

A knurled thumb pressure button 15 has a stem extending through a suitable aperture in lateral casing wall 10. The inner end of the button stem is preferably burred to secure it rigidly to wall 10. Diametrically opposite from button 15, casing wall 10 has rigidly secured thereto an external block 16 having a planar material abutment face 17 generally parallel to the axis of casing 11.

A flat mechanism support plate 18 is fastened upon the bottom wall of casing 11 as by rivets 19. Plate 18 is formed with integral upturned lugs 20 and 21 which are spaced along the edge of the plate inwardly of casing wall 10.

Figure 3:
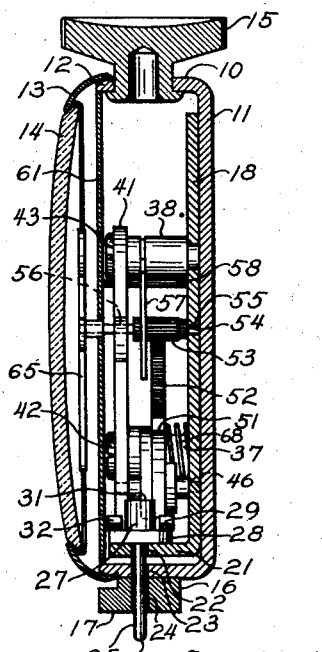
Figure 3 is a section along line 3—3 of Figure 1.

Lug 21, casing wall 10, and block 16 are formed with aligned apertures 22, 23 and 24, respectively (Figure 3), which have a common axis extending radially of the casing in diametral alignment with the stem of button 15 and accurately normal to planar face 17.

A plunger or pin 25 is slidably disposed in the guideway provided by aligned apertures 22, 23 and 24. Plunger 25 projects a substantial distance externally of face 17 and terminates in a relatively blunt non-cutting tip 26 adapted to engage the material to be tested or measured. Plunger 25 is slidable perpendicularly to face 17.

Plunger 25 is formed with an enlarged head 27 the base of which is surrounded by a wide flange 28 adapted to seat on the inner face of lug 21. Flange 28 is provided with an annular planar face 29 extending about the base of head 27, and head 27 is provided with a planar end face 31. Faces 29, 31 and abutment face 17 are parallel.

Flange face 29 provides a bearing surface slidably engaging the upturned bifurcated free end portion 32 of a flat arcuate spring 33. The other end of spring 33 is suitably anchored on lug 20, by screw 30. Spring 33 reacts against flange face 29 to oppose inward sliding movement of plunger 25 and to urge flange 28 against lug 21.

An upstanding block 34 rigid with plate 18 provides support for an adjustable stop comprising a screw 35 threaded in the block. The outer end of screw 35 engages spring 33 substantially medially between its ends. A suitable set screw 36 or the like locks screw 35 in adjusted position. Adjustment of screw 35 varies the force with which spring 33 opposes inward sliding movement of plunger 25.

Spaced upstanding posts 37 and 38, suitably fastened to plate 18, rigidly support a flat L-shaped plate 41 in spaced and parallel relation to plate 18. Screws 42 and 43, respectively, are employed to clamp plate 41 upon the posts.

Figure 5:
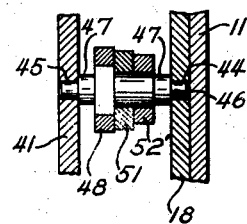
Figure 5 is a section along line 5—5 of Figure 2.

Parallel plates 18 and 41 are formed with aligned bearing apertures 44 and 45 for receiving opposite ends of a rotatable shaft 46 (Figure 5). Enlarged shaft portions 47 determine the correct axial location of shaft 46 in its bearings.

A lever 48, rigidly secured as by a force fit upon an intermediate enlarged portion of shaft 46, is arcuately bent intermediate its ends and terminates in a straight portion 49 which extends generally parallel to the axis of plunger 25 and is formed with a tip 50 slidably engaging face 31 of the plunger head. Below lever 48, a segment gear 51 is rigidly secured, as by a force fit, upon shaft 46. A suitable washer 52' helps retain gear 51 against axial displacement on the shaft.

Gear 51 is formed with teeth 52 meshed with a pinion 53 rigid with a dial pointer shaft 54 rotatably supported in spaced bearing apertures 55 and 56 in plates 18 and 41, respectively. Shaft 54 is parallel to shaft 46.

A hair spring 57 surrounding shaft 54 has one end attached to the shaft and the other end fixed to post 38 or some other stationary member. Spring 57 urges rotation of shaft 54 counter-clockwise (Figure 2) for a purpose to be described.

Upstanding from plate 18 are spaced dial posts 58 and 59 adapted to carry a dial plate 61 having a graduated face 62 visible through window 14. Screws 63 or equivalent fastening elements secure the dial plate upon posts 58 and 59.

Dial plate 61 is centrally apertured at 64 so that pointer shaft 54 is permitted to project therethrough to support an indicator pointer 65 adapted to cooperate with the graduated dial face. Pointer 65 has a non-rotatable friction fit on the end of shaft 54 and may be removed from the shaft by an axial pull.

Dial face 62 and pointer 65 provide a visible indicator for the durometer.

Figure 6:
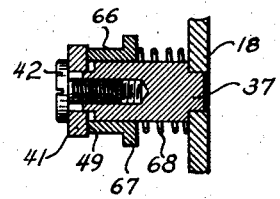
Figure 6 is an expanded view of the elements of Figure 4 while the instrument is being assembled on the support plate.

Figure 6 illustrates a preferred construction facilitating assembly of the mechanism between plates 18 and 41.

Slidably mounted on post 37 is a collar 66 having an enlarged flange 67 and a coil spring 68 is compressed between flange 67 and plate 18. Plate 41 seats on a reduced shoulder 69 at the top of post 37 when the instrument is assembled and spring 68 urges collar 66 toward plate 41.

Figure 4:
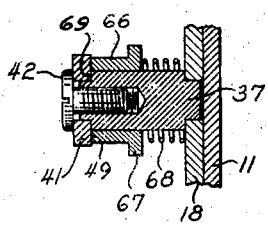
Figure 4 is a section along line 4—4 in Figure 2.

During assembly, plate 41 is fitted upon the ends of posts 37 and 38 and screws 42 and 43 are only partly tightened so that plate 41 is supported above the posts. Plate 41 is temporarily held tightly in this position by the action of spring 68 and it is spaced from plate 18 by an amount greater than when the instrument is completely assembled (Figure 6). Shafts 46 and 54 and the other motion transmitting mechanism are then slipped into position between the plates and screws 42 and 43 are tightened to clamp plate 41 securely to the posts (Figure 4).

The instrument, with all of the above described mechanism assembled on plate 18, is properly adjusted and calibrated. Then the mechanism is inserted as a unit into casing 11 and riveted thereto. Since circular plate 18 is of smaller diameter than casing 11, this assembly is easily effected by initially inserting plunger 25 into opening 23 and then rocking the plate into the casing.

Figure 2:
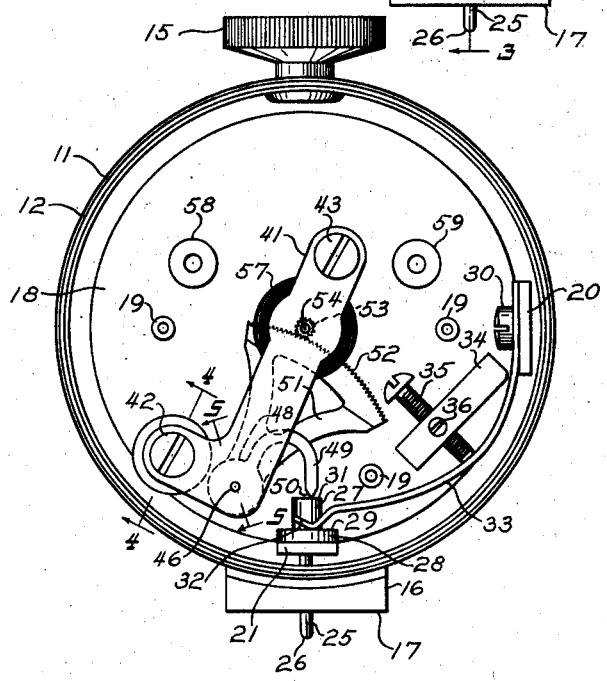
Figure 2 is a front elevation of the durometer of Figure 1 with the cover glass, indicator dial and pointer removed.

In operation, plunger tip 26 is pressed against the surface of a deformable specimen to be tested by pressure exerted downwardly on button 15. This pressure is continued until face 17 abuts the surface of the material. During the operation, plunger tip 26 does not penetrate the specimen surface and plunger 25 will be axially slidably displaced inwardly of the casing against the force of spring 33 in accordance with the amount of resistance to deformation offered to it by the specimen. The harder the specimen, the less it will deform beneath plunger tip 26 and the further inwardly plunger 25 will be displaced. As plunger 25 slides inwardly of the casing, lever 48 is rocked by reason of its slidable bearing against the top face 31 of the plunger thus rotating shaft 46 and segment gear 51 counter-clockwise (Figure 2). Gear 51 in turn rotates pinion 53 and the dial pointer shaft clockwise.

Dial plate 62 is so graduated and the instrument mechanism is so designed that when the parts are in the position of Figure 2, with plunger 25 fully extended, pointer 65 is at zero position. Retraction of plunger 25 until tip 26 is flush with face 17 causes maximum rotation of pointer 65, usually marked 100 on plate 62. The scale is suitably graduated and calibrated between these limit positions.

With face 17 pressed against the surface of the specimen as described reading of the indicator gives a measurement of the hardness of the specimen.

When the instrument is removed from the specimen, spring 33 returns plunger 25 to the extended position of Figure 2 and hair spring 57 returns the rest of the mechanism including the pointer to zero position.

The present invention provides a structurally simple, rugged, inexpensive and accurate durometer which is easily assembled and adjusted. Access to the internal mechanism for repair and calibration may be had merely by removing bezel 13, pointer 65 and plate 61.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a measuring instrument a mechanism assembly comprising a movable plunger having an enlarged head, an indicator and means transmitting motion of said plunger to said indicator, a plate upon which said assembly is mounted, an upstanding apertured lug on said plate, said plunger projecting through said lug, a second lug on said plate spaced from the first lug, a cantilever spring having one end mounted on said second lug and the other end extending into engagement with the head of said plunger to urge the head of said plunger against said first lug, a block attached to said plate and adjustable means threaded in said block and engaging the spring between the plunger and the second lug to vary the force exerted by said spring on the head of said plunger, and indicator dial support posts rigid with said plate.

2. In a measuring instrument, a plate, a plurality of upstanding spaced posts rigid with said plate, a second plate mounted on said posts and extending parallel to said first plate, a plurality of shafts parallel to each other and to said posts having opposite ends journaled in said plates, a slidable sleeve on one of said posts, a spring urging said sleeve into engagement with said second plate, and means operable to move said second plate towards said first plate against the action of said spring.

3. A measuring instrument comprising an open ended casing provided with an external pressure knob and with a diametrically opposite external abutment having a face adapted to contact a specimen to be measured, a passageway through the abutment to the interior of the casing, a slidable plunger guided by the walls of the passageway and projecting a short distance from the ends thereof, indicating mechanism within said casing connected to said plunger, and a cantilever spring opposing movement of said plunger toward the interior of the casing, said plunger, mechanism and spring being of small size relative to the open end of said casing and mounted on a single support for insertion and removal from the casing as a unit.

4. In a measuring instrument, a casing, an abutment rigid with a wall of said casing and having a planar specimen contacting face externally of said casing, a plunger slidable in a guideway in said abutment in a direction normal to said face, said plunger having a specimen contacting end exteriorly of the casing and an enlarged end within the casing forming a head limiting the outward movement of said plunger, rotatable indicator mechanism within the casing and motion translating means resting against the head of said plunger to transmit motion of said plunger to said indicator, and a cantilever spring having an end rigid with said casing and the other end engaging the head of said plunger and opposing inward sliding movement of said plunger.

5. In a measuring instrument, a substantially planar supporting plate; a first support having a passageway therethrough attached to said plate substantially at right angles thereto and adjacent its periphery; a second support attached to said plate adjacent its periphery and spaced from said first support; a plunger seated in the passageway in said first support, having an enlarged head engaging said support and limiting its movement in one direction; a cantilever spring attached at one portion to said second support, another portion engaging the head of said plunger to resist movement of said head away from said first support; an indicating mechanism attached to said supporting plate; means connected to actuate said indicating mechanism and having a portion contacting the head of said plunger to transmit motion of said plunger to said indicator; and a spring resiliently urging said means against the head portion of said plunger.

6. In the instrument described in claim 5, a third support attached to said plate between said second and third supports, and means adjustably positioned on said support and engaging said cantilever spring to control its strength.

7. In the instrument described in claim 5, a cup shaped casing having a specimen contacting abutment on its exterior side wall and provided with a passageway from the outside of said abutment to the interior thereof; means locating said plate and supports relative to said casing, with the passageways in said first support and in said abutment in alignment and said plunger positioned in the passageway in said abutment with its end protruding therefrom and beyond the face of said abutment.

MAXIMILIAN KLEIN.
ERNEST H. GRAUEL.